US012801974B2

(12) United States Patent
Wu et al.

(10) Patent No.: US 12,801,974 B2
(45) Date of Patent: Nov. 17, 2026

(54) METHOD FOR DISTRIBUTED TRAINING MODEL, RELEVANT APPARATUS, AND COMPUTER READABLE STORAGE MEDIUM

(71) Applicant: BEIJING BAIDU NETCOM SCIENCE AND TECHNOLOGY CO., LTD., Beijing (CN)

(72) Inventors: Xinxuan Wu, Beijing (CN); Xuefeng Yao, Beijing (CN); Dianhai Yu, Beijing (CN); Zhihua Wu, Beijing (CN); Yanjun Ma, Beijing (CN); Tian Wu, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1106 days.

(21) Appl. No.: 17/362,674

(22) Filed: Jun. 29, 2021

(65) Prior Publication Data

US 2021/0357814 A1 Nov. 18, 2021

(30) Foreign Application Priority Data

Dec. 18, 2020 (CN) ........................ 202011499413.0

(51) Int. Cl.
*G06N 20/00* (2019.01)

(52) U.S. Cl.
CPC .................................... *G06N 20/00* (2019.01)

(58) Field of Classification Search
CPC .......... G06N 3/045; G06N 3/08; G06N 3/098; G06N 5/043; G06N 20/00
See application file for complete search history.

(56) References Cited

U.S. PATENT DOCUMENTS 11,409,685 B1 * 8/2022 Kaplan ............... H04L 67/1095
2015/0324690 A1 11/2015 Chilimbi et al.
(Continued)

FOREIGN PATENT DOCUMENTS

CN 108491928 A 9/2018
CN 109145984 A 1/2019
(Continued)

OTHER PUBLICATIONS

H Hu, et al, Distributed Machine Learning through Heterogeneous Edge Systems, Proceedings of 34th AAAI Conference on AI 2020 (Year: 2020).*

(Continued)

*Primary Examiner* — Markus A. Vasquez
(74) *Attorney, Agent, or Firm* — Cozen O'Connor

(57) ABSTRACT

The present disclosure provides a method and apparatus for distributed training a model, an electronic device, and a computer readable storage medium. The method may include: performing, for each batch of training samples acquired by a distributed first trainer, model training through a distributed second trainer to obtain gradient information; updating a target parameter in a distributed built-in parameter server according to the gradient information; and performing, in response to determining that training for a preset number of training samples is completed, a parameter exchange between the distributed built-in parameter server and a distributed parameter server through the distributed first trainer to perform a parameter update on the initial model until training for the initial model is completed.

11 Claims, 6 Drawing Sheets

(56) References Cited

U.S. PATENT DOCUMENTS

| | | | | |
|---|---|---|---|---|
| 2018/0285759 | A1 | 10/2018 | Wood et al. | |
| 2018/0331897 | A1 | 11/2018 | Zhang et al. | |
| 2019/0019104 | A1 * | 1/2019 | Liu | G06N 20/00 |
| 2019/0325302 | A1 * | 10/2019 | Savic | G06N 3/08 |
| 2020/0174840 | A1 * | 6/2020 | Zhao | G06F 9/5011 |
| 2020/0334524 | A1 | 10/2020 | Sprague et al. | |
| 2021/0286650 | A1 * | 9/2021 | Henry | G06F 9/5027 |
| 2021/0342684 | A1 * | 11/2021 | Shraga | G06N 3/04 |
| 2022/0156649 | A1 * | 5/2022 | Mohan | G06N 3/084 |

FOREIGN PATENT DOCUMENTS

| | | | |
|---|---|---|---|
| CN | 109634759 | A | 4/2019 |
| CN | 109635922 | A | 4/2019 |
| CN | 110059829 | | 7/2019 |
| CN | 110084378 | A | 8/2019 |
| CN | 111695689 | A | 9/2020 |
| CN | 111709533 | A | 9/2020 |
| CN | 111753997 | A | 10/2020 |
| WO | WO 2018162069 | A1 | 9/2018 |

OTHER PUBLICATIONS

W Zhao, et al, Distributed Hierarchical GPU Parameter Server for Massive Scale Deep Learning Ads Systems, 3rd MLSys Conference 2020, https://arxiv.org/pdf/2003.05622v1 (Year: 2020).*

L Mai, et al, KungFu: Making Training in Distributed Machine Learning Adaptive, Proceedings of 14th USENIX Symposium on Operating Systems Design and Implementation 2020 (Year: 2020).*

M Abadi, et al, TensorFlow: A System for Large-Scale Machine Learning, Proceedings of 12th USENIX Symposium on Operating Systems Design and Implementation 2016 (Year: 2016).*

M Li, et al, Scaling Distributed Machine Learning with the Parameter Server, Proceedings of 11th USENIX Symposium on Operating Systems Design and Implementation 2014 (Year: 2014).*

Woo-Yeon Lee, et al, Automating System Configuration of Distributed Machine Learning, Proceedings of 2019 IEEE 39th ICDCS (Year: 2019).*

E P Xing, et al, Strategies and Principles of Distributed Machine Learning on Big Data, Engineering, vol. 2, pp. 179-195, 2016 (Year: 2016).*

C Renggli, et al, SparCML: High-Performance Sparse Communication for Machine Learning, Proceedings of the International Conference for High Performance Computing, Networking, Storage and Analysis 2019, Article No. 11, https://dl.acm.org/doi/abs/10.1145/3295500.3356222 (Year: 2019).*

Naumov, Maxim, et al. "Deep learning training in facebook data centers: Design of scale-up and scale-out systems." arXiv preprint arXiv:2003.09518 (2020). (Year: 2020).*

Li et al., Parameter Server for Distributed Machine Learning, 10 pages.

Shu et al., Survey of Distributed Machine Learning Platforms and Algorithms, Computer Science, vol. 46, No. 3, Mar. 2019, 15 pages.

Siyuan, Research on Parameter-exchanging Optimizing Mechanism in Distributed Deep Learning, Huazhong University of Science and Technology thesis, May 2015, 65 pages.

Qinqing Zheng et al.: "ShadowSync: Performing Synchronization in the Background for Highly Scalable Distributed Training" Mar. 10, 2020, 18 pages.

Bilge Acun et al.: "Understanding Training Efficiency of Deep Learning Recommendation Models at Scale" Nov. 11, 2020, 13 pages.

European Patent Application No. 21182348.9 Extended Search Report and Opinion, dated Jan. 25, 2022, 9 pages.

* cited by examiner

300

METHOD FOR DISTRIBUTED TRAINING MODEL, RELEVANT APPARATUS, AND COMPUTER READABLE STORAGE MEDIUM

CROSS-REFERENCE TO RELATED APPLICATIONS

This application claims priority to Chinese Patent Application No. 202011499413.0, filed on Dec. 18, 2020, titled "Method for distributed training model, relevant apparatus and computer program product," the content of which is hereby incorporated by reference in its entirety.

TECHNICAL FIELD

The present disclosure relates to the field of computer technology, and more specifically, to the field of deep learning technology, and more particularly, to a method and apparatus for distributed training a model, an electronic device, and a computer readable storage medium.

BACKGROUND

With the promotion of the wave of big data and the rapid development of deep learning technology, the data scale and the model scale that are involved in deep learning grow tremendously. The dual challenge of big data and big model is an unbearable burden for stand-alone training. Thus, it is necessary to use a data-parallel distributed training mode to meet business requirements. At present, a decentralized distributed training mode and a centralized distributed training mode are generally adopted.

SUMMARY

Embodiments of the present disclosure provide a method and apparatus for distributed training a model, an electronic device, and a computer readable storage medium.

According to a first aspect, an embodiment of the present disclosure provides a method for distributed training a model, including: performing, for each batch of training samples acquired by a distributed first trainer, model training through a distributed second trainer to obtain gradient information; updating a target parameter in a distributed built-in parameter server according to the gradient information, the distributed built-in parameter server being provided in the distributed second trainer, and the target parameter being a portion of parameters of an initial model; and performing, in response to determining that training for a preset number of training samples is completed, a parameter exchange between the distributed built-in parameter server and a distributed parameter server through the distributed first trainer to perform a parameter update on the initial model until training for the initial model is completed.

According to a second aspect, an embodiment of the present disclosure provides an apparatus for distributed training a model, including: a training unit, configured to perform, for each batch of training samples acquired by a distributed first trainer, model training through a distributed second trainer to obtain gradient information; a target parameter updating unit, configured to update a target parameter in a distributed built-in parameter server according to the gradient information, the distributed built-in parameter server being provided in the distributed second trainer, and the target parameter being a portion of parameters of an initial model; and a parameter exchanging unit, configured to perform, in response to determining that training for a preset number of training samples is completed, a parameter exchange between the distributed built-in parameter server and a distributed parameter server through the distributed first trainer, to perform a parameter update on the initial model until training for the initial model is completed.

According to a third aspect, an embodiment of the present disclosure provides an electronic device, including: at least one processor; and a memory, communicatively connected with the at least one processor. The memory stores an instruction executable by the at least one processor, and the instruction is executed by the at least one processor, to enable the at least one processor to perform the method according to the first aspect.

According to a fourth aspect, an embodiment of the present disclosure provides a non-transitory computer readable storage medium, storing a computer instruction. The computer instruction is used to cause a computer to perform the method according to the first aspect.

According to the method and apparatus for distributed training a model, the electronic device, the computer readable storage medium and the computer program product that are provided in embodiments of the present disclosure, for each batch of training samples acquired by the distributed first trainer, the model training is first performed through the distributed second trainer to obtain the gradient information. Then, the target parameter in the distributed built-in parameter server is updated according to the gradient information. Here, the distributed built-in parameter server is provided in the distributed second trainer, and the target parameter refers to the portion of the parameters of the initial model. Finally, in response to determining that the training for the preset number of training samples is completed, the parameter exchange between the distributed built-in parameter server and the distributed parameter server is performed through the distributed first trainer, to perform the parameter update on the initial model until the training for the initial model is completed.

It should be understood that the content described in this portion is not intended to identify key or important features of embodiments of the present disclosure, and is not used to limit the scope of the present disclosure. Other features of the present disclosure will be easily understood through the following description.

BRIEF DESCRIPTION OF THE DRAWINGS

After reading detailed descriptions for non-limiting embodiments given with reference to following accompanying drawings, other features, objectives and advantages of the present disclosure will be more apparent.

DETAILED DESCRIPTION OF EMBODIMENTS

Example embodiments of the present disclosure are described below in combination with accompanying drawings, and various details of embodiments of the present disclosure are included in the description to facilitate understanding, and should be considered as examples. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description. It should be noted that the embodiments in the present disclosure and the features in the embodiments may be combined with each other on a non-conflict basis.

Figure 1:
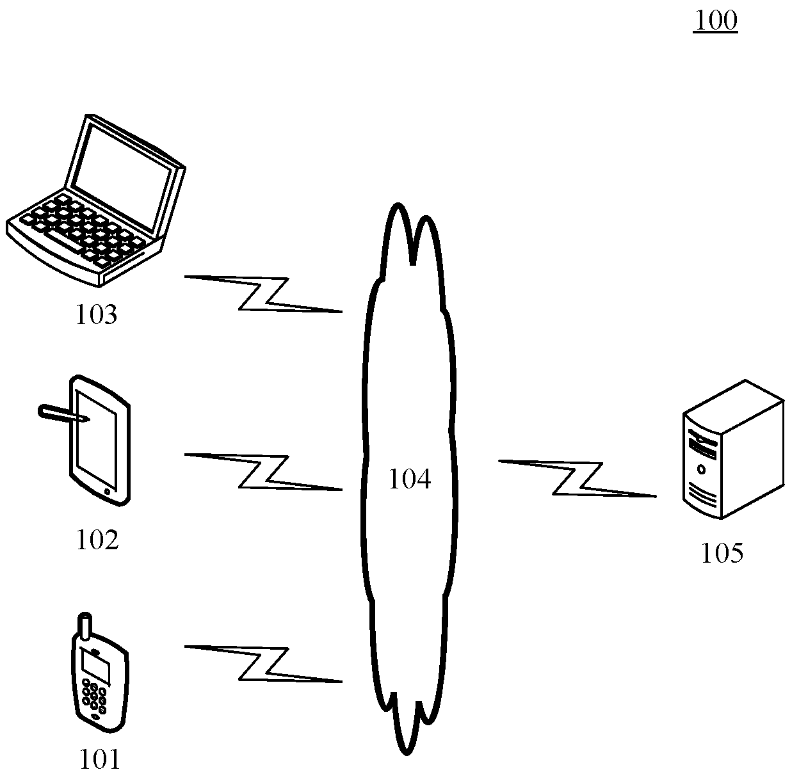
FIG. 1 is a diagram of an example system architecture in which an embodiment of the present disclosure may be applied.

FIG. 1 illustrates an example system architecture 100 in which a method and apparatus for distributed training a model, an electronic device and a computer readable storage medium according to embodiments of the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

The terminal devices 101, 102 and 103 may be hardware devices or software that supports a network connection for information exchanging and data processing. When the terminal devices 101, 102 and 103 are hardware, the terminal devices 101, 102 and 103 may be various electronic devices supporting an function such as a network connection function, an information exchange function, an information display function, and an information processing function, the electronic devices including, but not limited to, a smart phone, a tablet computer, a vehicle-mounted computer, a laptop portable computer, a desktop computer, and the like. When the terminal devices 101, 102 and 103 are the software, the terminal devices 101, 102 and 103 may be installed in the above listed electronic devices. The terminal devices may be implemented as, for example, a plurality of pieces of software or a plurality of software modules that are used for providing a distributed service, or as a single piece of software or a single software module, which will not be specifically defined here.

The server 105 may be a server providing various services. For example, the server 105 may be a backend processing server that acquires gradient information calculated by the terminal devices 101, 102 and 103 and performs a parameter update on a model. As an example, the server 105 may be a cloud server.

It should be noted that the server may be hardware or software. When the server is the hardware, the server may be implemented as a distributed server cluster composed of a plurality of servers, or may be implemented as a single server. When the server is the software, the server may be implemented as a plurality of pieces of software or a plurality of software modules (e.g., software or software modules for providing a distributed service), or may be implemented as a single piece of software or a single software module, which will not be specifically defined here.

It should also be noted that the method for distributed training a model provided in embodiments of the present disclosure may be performed by the server, performed by the terminal devices, or performed by the server and the terminal devices in cooperation with each other. Correspondingly, the parts (e.g., units and modules) included in the apparatus for distributed training a model may be all provided in the server, all provided in the terminal devices, or respectively provided in the server and the terminal devices.

It should be appreciated that the numbers of the terminal devices, the networks, and the servers in FIG. 1 are merely illustrative. Any number of terminal devices, networks, and servers may be provided based on actual requirements. When an electronic device on which the method for distributed training a model runs does not need to perform a data transmission with an other electronic device, the system architecture may include only the electronic device (e.g., the server or the terminal devices) on which the method for distributed training a model runs.

Figure 2:
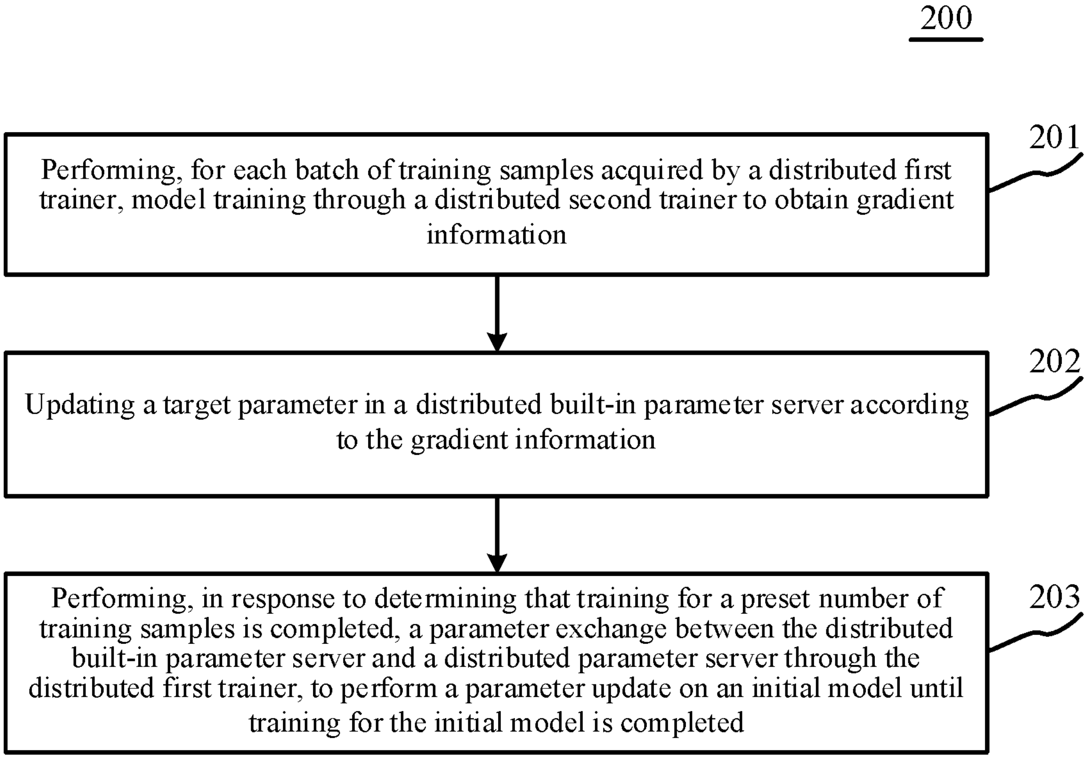
FIG. 2 is a flowchart of a method for distributed training a model according to an embodiment of the present disclosure.

Further referring to FIG. 2, FIG. 2 illustrates a flow 200 of an embodiment of a method for distributed training a model. The flow 200 includes the following steps.

Step 201, performing, for each batch of training samples acquired by a distributed first trainer, model training through a distributed second trainer to obtain gradient information.

In this embodiment, an executing body (e.g., the server in FIG. 1) of the method for distributed training a model may perform, for the each batch of training samples acquired by the distributed first trainer, the model training through the distributed second trainer to obtain the gradient information. Here, the number of the training samples in each batch may be specifically set based on an actual situation. For example, the number of the training samples in each batch is 32.

A model trained through the method for distributed training a model may be various deep learning models, including, but not limited to, a convolutional neural network model, a recurrent neural network model, a residual network model, and an adversarial network model. Generally, the executing body may perform a forward propagation calculation process through the distributed second trainer to obtain a loss (Loss); and perform a back propagation calculation process through the distributed second trainer to obtain the gradient (Grad) information.

In this embodiment, a model training system for the method for distributed training a model includes the distributed first trainer, the distributed second trainer, and a distributed parameter server. Here, in step 201, the distributed first trainer is mainly used to acquire the training samples and transmit the training samples to a corresponding distributed second trainer. The distributed second trainer performs a training process on an initial model mainly according to the training samples, to obtain the gradient information.

The distributed first trainer, the distributed second trainer, and the distributed parameter server may respectively include a plurality of trainers, to be applicable to the training for a network model of a big data scale and a big model scale. For example, the distributed first trainer includes a plurality of first trainers.

It may be appreciated that the distributed first trainer and the distributed second trainer in this embodiment may be trainers running on heterogeneous devices. That is, devices used by different trainers are different. As an example, the distributed first trainer may be an electronic device mainly based on a CPU (central processing unit), such that the distributed first trainer has a better performance in inputting and outputting data. The distributed second trainer is an electronic device mainly based on a GPU (graphics processing unit) and an AI (artificial intelligence) chip, such that the distributed second trainer has a better performance in processing and calculating data.

In some alternative implementations of this embodiment, the trainers in the distributed second trainer adopt heterogeneous devices. As an example, the trainers in the distributed second trainer may include a GPU trainer mainly based on a GPU, an NPU (Neural network Processing Unit) trainer mainly based on an NPU, a Kunlun sub-trainer mainly based on a Kunlun chip (artificial intelligence chip of Baidu), and the like. In this implementation, the performance of each trainer in the distributed second trainer may be adapted to the deployed training flow, to improve the utilization rate of the trainer and the training speed of the model.

Step 202, updating a target parameter in a distributed built-in parameter server according to the gradient information.

In this embodiment, the executing body may update the target parameter in the distributed built-in parameter server according to the gradient information. Here, the distributed built-in parameter server is provided in the distributed second trainer, and the target parameter refers to a portion of parameters of the initial model.

As an example, a video memory of each second trainer in the distributed second trainer is provided with a built-in parameter server in a distributed built-in parameter server. For the target parameter, with each batch of training samples as a unit and based on the gradient information obtained through the batch of training samples, the executing body may update the target parameter through the distributed built-in parameter server.

Generally, a parameter of a network model includes a sparse parameter and a dense parameter. For a network model having a large scale of parameters, the data scale of sparse parameters is much larger than that of dense parameters. The target parameter in this embodiment may include all dense parameters and a portion of sparse parameters. Through the gradient information, the executing body may perform a parameter update on all the dense parameters and the portion of sparse parameters in the target parameter.

In some alternative implementations of this embodiment, for the dense parameters in the target parameter, the executing body may perform the parameter update between the second trainers in the distributed second trainer by means of a collective communication. Here, the collective communication may be, for example, a communication such as Reduce and AllReduce. Specifically, for the dense parameters in the target parameter, the executing body may perform the update on the dense parameters in the distributed second trainer, with each batch of training samples as the unit and by means of the collective communication. The dense parameters are updated by means of the collective communication, which fully utilizes the excellent communication capability of the distributed second trainer, and improves the communication efficiency. Thus, the speed at which the model is trained is improved.

In some alternative implementations of this embodiment, for the sparse parameters in the target parameter, the executing body may perform the parameter update in the distributed second trainer by means of a remote procedure call.

Specifically, for the portion of sparse parameters in the target parameter, the executing body may transmit the obtained gradient information to the distributed built-in parameter server with each batch of training samples as the unit. The distributed built-in parameter server performs the parameter update by means of the RPC (Remote Procedure Call), and feeds back the updated sparse parameters to the distributed second trainer.

In some alternative implementations of this embodiment, in combination with the above two communications, the executing body may perform, for the dense parameters in the target parameter, the parameter update in the distributed second trainer by means of the collective communication; and perform, for the sparse parameters in the target parameter, the parameter update in the distributed second trainer by means of the remote procedure call.

In this implementation, the dense parameters and the sparse parameters are updated by means of different communications, thereby improving the flexibility of the communication during the parameter update.

Step 203, performing, in response to determining that training for a preset number of training samples is completed, a parameter exchange between the distributed built-in parameter server and a distributed parameter server through the distributed first trainer, to perform a parameter update on an initial model until training for the initial model is completed.

In this embodiment, in response to determining that the training for the preset number of training samples is completed, the executing body may perform the parameter exchange between the distributed built-in parameter server and the distributed parameter server through the distributed first trainer, to perform the parameter update on the initial model until the training for the initial model is completed.

In this embodiment, the executing body performs a plurality of parameter exchanges between the distributed built-in parameter server and the distributed parameter server with the preset number of training samples as a unit, until the training for the initial model is completed. It may be appreciated that the preset number of training samples are used to train the initial model to update the target parameter. Here, the parameter exchange includes: transmitting the updated target parameter in the distributed built-in parameter server to the distributed parameter server through the distributed first trainer, to perform the parameter update on the initial model in the distributed parameter server; and acquiring a new target parameter from the distributed parameter server through the distributed first trainer, and loading the new target parameter to the distributed built-in parameter server. It can be seen that, in step 203, the distributed first trainer is required to have the parameter exchange functionality, in addition to the functionality of acquiring the training samples in step 201.

Specifically, the executing body performs the following parameter update operation until the training for the initial model is completed.

First, in response to determining that the training for the preset number of training samples is completed, the updated target parameter in the distributed built-in parameter server is transmitted to the distributed parameter server through the distributed first trainer, to perform the parameter update on the initial model in the distributed parameter server.

Then, a target parameter for a next parameter update operation in the distributed built-in parameter server is acquired from the distributed parameter server through the distributed first trainer.

In this implementation, after each time the preset number of training samples are trained, the executing body performs the parameter exchange between the distributed built-in parameter server and the distributed parameter server. During the training for the preset number of training samples, the executing body performs the parameter update in the distributed second trainer through the distributed built-in parameter server, thereby reducing the exchange frequency at which the parameter update between the distributed built-in parameter server and the distributed parameter server is performed through the distributed first trainer.

In some alternative implementations of this embodiment, an information exchange is performed between the trainers by means of an information queue. The distributed first trainer and the distributed second trainer are respectively provided with a corresponding information queue. For the distributed first trainer or the distributed second trainer, the executing body performs an information exchange with an other trainer based on the information queue corresponding to the distributed first trainer or the distributed second trainer. The asynchronous processing mechanism between different trainers is realized through the information queue, thus improving the information processing efficiency.

In this embodiment, a trained target model is obtained in response to the training for the initial model is completed. Corresponding output data may be obtained by inputting input data into a pre-trained target model. As an example, when the trained target model is a model for face recognition, an image including a face object is inputted into the pre-trained target model to obtain a corresponding face recognition result. When the trained target model is a model for image classification, an input image is inputted into the pre-trained target model to obtain a corresponding image classification result. When the trained target model is a model for speech recognition, speech data is inputted into the pre-trained target model to obtain a corresponding speech recognition result.

Figure 3:
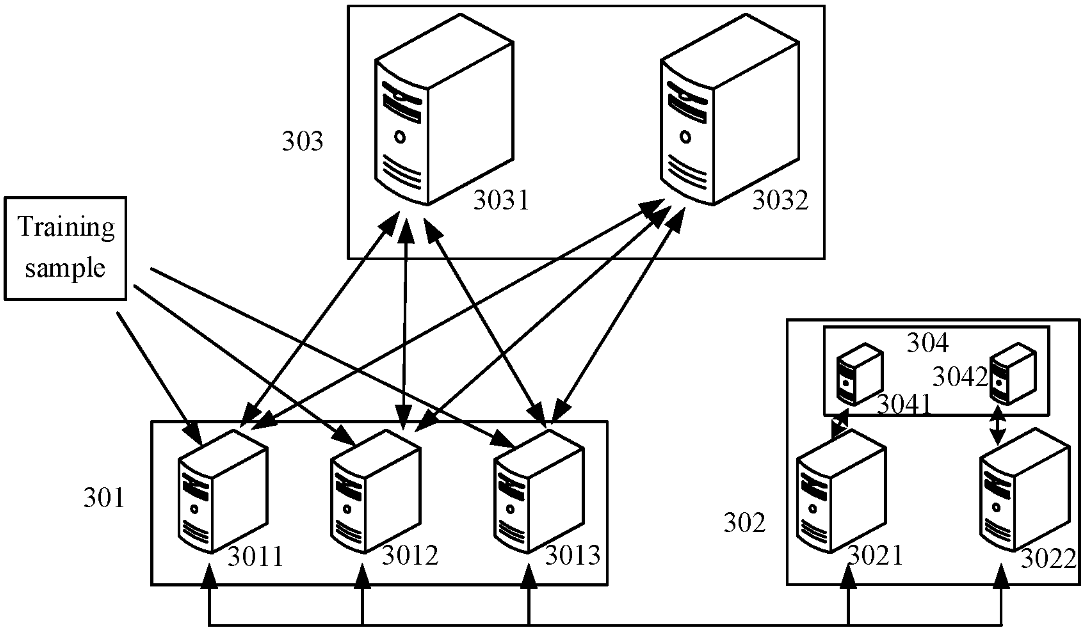
FIG. 3 is a schematic diagram of an application scenario of the method for distributed training a model according to the present disclosure.

Further referring to FIG. 3, FIG. 3 is a schematic diagram of an application scenario of the method for distributed training a model according to this embodiment. In the application scenario of FIG. 3, an initial model is a deep learning model for image classification. A distributed first trainer 301 includes trainers 3011, 3012 and 3013, a distributed second trainer 302 includes trainers 3021 and 3022, and a distributed parameter server 303 includes parameter servers 3031 and 3032. A distributed built-in parameter server 304 includes built-in parameter servers 3041 and 3042. Here, the built-in parameter server 3041 is provided in the trainer 3021 in the distributed second trainer 302, and the built-in parameter server 3042 is provided in the trainer 3022 in the distributed second trainer 302. For each batch of training samples acquired by the distributed first trainer 301, model training is performed through the distributed second trainer 302 to obtain gradient information. A target parameter in the distributed built-in parameter server 304 is updated according to the gradient information. Here, the target parameter refers to a portion of parameters of the initial model. In response to determining that training for a preset number of training samples is completed, a parameter exchange between the distributed built-in parameter server 304 and the distributed parameter server 303 is performed through the distributed first trainer 301, to perform a parameter update on the initial model until training for the initial model is completed.

In this embodiment, a method for distributed training a model is provided. Based on the distributed first trainer and the distributed second trainer that are heterogeneous, and the distributed built-in parameter server that is provided in the distributed second trainer, the speed at which the model is trained is improved.

In some alternative implementations of this embodiment, during the model training, the executing body adjusts computing power between the trainers based on a load balancing strategy, to cause the trainers to be matched with each other in computing power.

Here, the matching in the computing power is used to represent that the load states of the trainers are matched with each other. In this way, the trainers are all in a status of full load, reaching a best running status between the trainers, avoiding existence of idle trainers in the trainers, thereby improving the model training speed and a utilization rate of the trainer.

Figure 4:
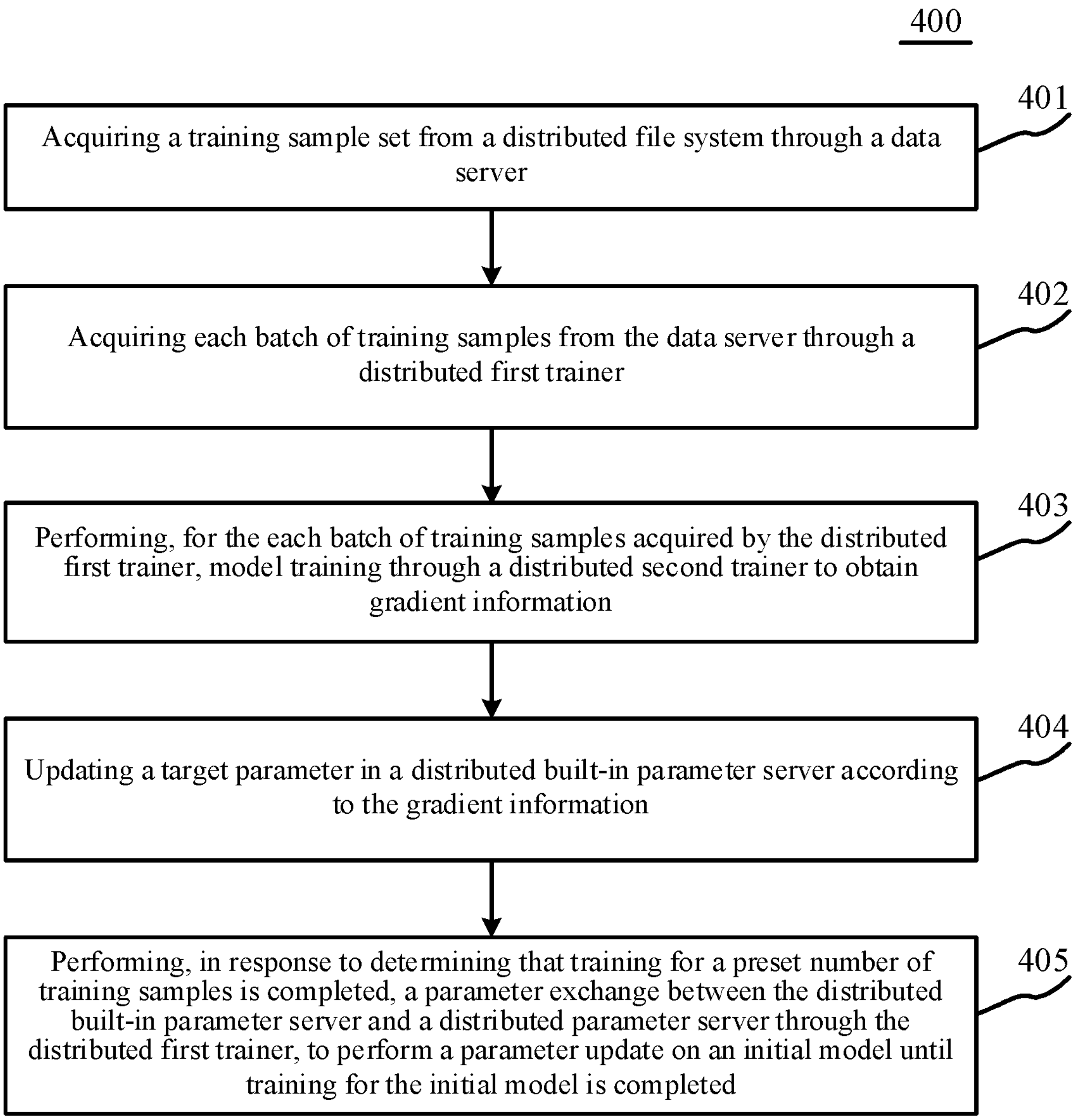
FIG. 4 is a flowchart of another embodiment of the method for distributed training a model according to an embodiment of the present disclosure.

Further referring to FIG. 4, FIG. 4 illustrates a schematic flow 400 of the method for distributed training a model according to another embodiment of the present disclosure. The flow 400 includes the following steps.

Step 401, acquiring a training sample set from a distributed file system through a data server.

In this embodiment, an executing body (e.g., the server in FIG. 1) of the method for distributed training a model acquires the training sample set from the distributed file system through the data server.

Here, the distributed file system may be an HDFS (Hadoop Distributed File System). The data server acquires the training sample set from the distributed file system in advance, which prevents a distributed first trainer from directly acquiring the training sample set from the distributed file system, and improves the rate at which a training sample is acquired, thereby improving the rate at which a model is trained.

In some alternative implementations of this embodiment, the data server is provided as an external hanging machine. The executing body may further adjust a number of machines of a central processing unit in the data server according to a data scale of the training sample set. In this implementation, the central processing unit in the data server is simply used to acquire data, and has no other functionalities. The number of the machines of the central processing unit in the data server may be flexibly set to adjust the rate at which the training sample is acquired, thereby improving the flexibility in training the model.

Step 402, acquiring each batch of training samples from the data server through a distributed first trainer.

In this embodiment, it may be appreciated that the data server may be regarded as a caching apparatus between the distributed first trainer and the distributed file system. During the training, the distributed first trainer continuously pulls training data from the data server to the local, thereby solving the problem that the speed at which the distributed first trainer continuously and directly read data from a distributed file system cluster is slow due to the insufficient memory.

In this embodiment, the executing body acquires the each batch of training samples from the data server through the distributed first trainer.

Step 403, performing, for the each batch of training samples acquired by the distributed first trainer, model training through a distributed second trainer to obtain gradient information.

Step 404, updating a target parameter in a distributed built-in parameter server according to the gradient information.

Step 405, performing, in response to determining that training for a preset number of training samples is completed, a parameter exchange between the distributed built-in parameter server and a distributed parameter server through the distributed first trainer, to perform a parameter update on an initial model until training for the initial model is completed.

In this embodiment, steps 403-405 may be performed with reference to steps 201-203, which will not be repeatedly described here.

In this embodiment, it can be seen from FIG. 4 that, as compared with the embodiment corresponding to FIG. 2, the flow 400 of the method for distributed training a model in this embodiment emphasizes that the distributed first trainer acquires the training samples from the data server. In this way, the rate at which the training samples are read is improved in this embodiment, thereby further improving the speed at which the model is trained.

Figure 5:
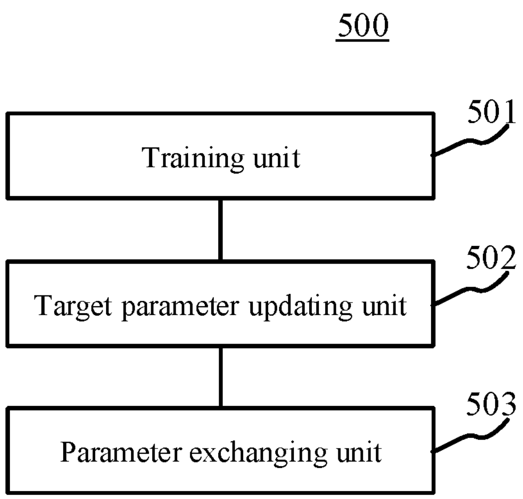
FIG. 5 is a flowchart of a cooperation and coordination of an apparatus for distributed training a model according to an embodiment of the present disclosure.

Further referring to FIG. 5, as an implementation of the method shown in FIG. 2, an embodiment of the present disclosure provides an apparatus for distributed training a model. The embodiment of the apparatus corresponds to the embodiment of the method shown in FIG. 2. In addition to the features described below, the embodiment of the apparatus may further include features identical or corresponding to those in the embodiment of the method shown in FIG. 2, and bring effects identical or corresponding to those in the embodiment of the method shown in FIG. 2. The apparatus may be applied in various electronic devices.

As shown in FIG. 5, an apparatus for distributed training a model in this embodiment includes: a training unit 501, configured to perform, for each batch of training samples acquired by a distributed first trainer, model training through a distributed second trainer to obtain gradient information; a target parameter updating unit 502, configured to update a target parameter in a distributed built-in parameter server according to the gradient information, the distributed built-in parameter server being provided in the distributed second trainer, and the target parameter being a portion of parameters of an initial model; and a parameter exchanging unit 503, configured to perform, in response to determining that training for a preset number of training samples is completed, a parameter exchange between the distributed built-in parameter server and a distributed parameter server through the distributed first trainer, to perform a parameter update on the initial model until training for the initial model is completed.

In some alternative implementations of this embodiment, the parameter exchanging unit 503 is further configured to: perform a following parameter update operation until the training for the initial model is completed: transmitting, in response to determining that the training for the preset number of training samples is completed, the updated target parameter in the distributed built-in parameter server to the distributed parameter server through the distributed first trainer, to perform the parameter update on the initial model in the distributed parameter server; and acquiring a target parameter for a next parameter update operation in the distributed built-in parameter server from the distributed parameter server through the distributed first trainer.

In some alternative implementations of this embodiment, the target parameter updating unit 502 is further configured to: perform, for a dense parameter in the target parameter, a parameter update in the distributed second trainer by means of a collective communication.

In some alternative implementations of this embodiment, the target parameter updating unit 502 is further configured to: perform, for a sparse parameter in the target parameter, a parameter update in the distributed second trainer by means of a remote procedure call.

In some alternative implementations of this embodiment, the target parameter updating unit 502 is further configured to: perform, for the dense parameter in the target parameter, the parameter update in the distributed second trainer by means of the collective communication; and perform, for the sparse parameter in the target parameter, the parameter update in the distributed second trainer by means of the remote procedure call.

In some alternative implementations of this embodiment, the above apparatus further includes: an acquiring unit (not shown in the figure), configured to acquire a training sample set from a distributed file system through a data server; and acquire each batch of training samples from the data server through the distributed first trainer.

In some alternative implementations of this embodiment, the data server is provided as an external hanging machine. The apparatus further includes: a first adjusting unit (not shown in the figure), configured to adjust the number of machines of a central processing unit in the data server according to a data scale of the training sample set.

In some alternative implementations of this embodiment, an information exchange is performed between trainers through an information queue.

In some alternative implementations of this embodiment, the above apparatus further includes: a second adjusting unit (not shown in the figure), configured to adjust, during the model training, computing power between the trainers based on a load balancing strategy, to cause the trainers to be matched with each other in computing power.

According to this embodiment, a method for distributed training a model is provided. Based on the distributed first trainer and the distributed second trainer that are heterogeneous, and the distributed built-in parameter server that is provided in the distributed second trainer, the speed at which the model is trained is improved.

According to the present disclosure, embodiments of the present disclosure further provides an electronic device, a readable storage medium, and a computer program product.

Figure 6:
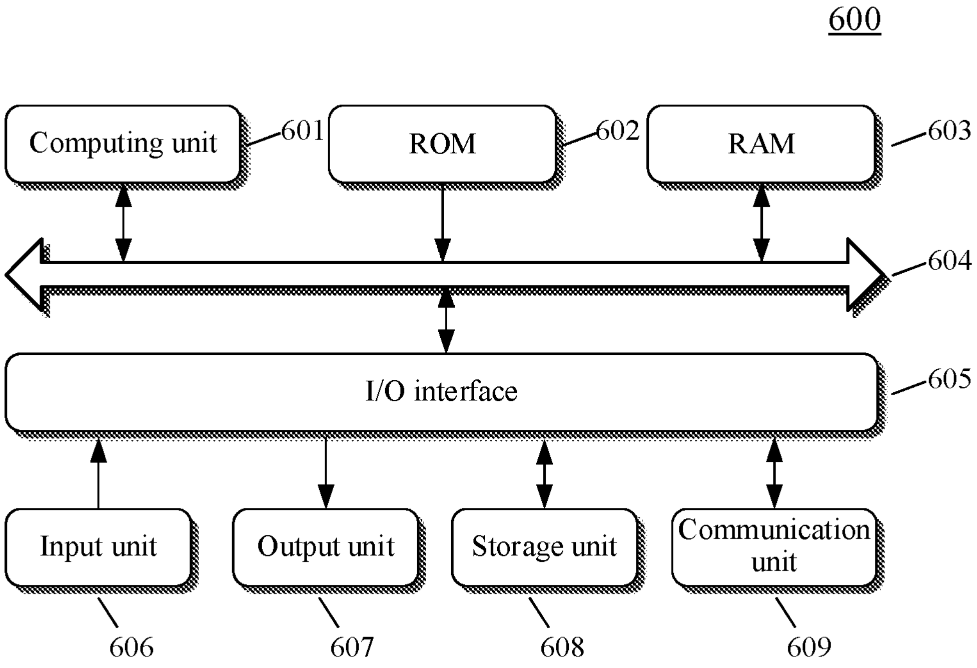
FIG. 6 is a schematic structural diagram of an electronic device/terminal device or a computer system of a server that is adapted to implement embodiments of the present disclosure.

FIG. 6 is a schematic block diagram of an example electronic device 600 that may be used to implement embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 6, the device 600 includes a computing unit 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the device 600. The computing unit 601, the ROM 602 and the RAM 603 are connected to each other through a bus 604. An input/output (I/O) interface 605 is also connected to the bus 604.

A plurality of components in the device 600 are connected to the I/O interface 605, including: an input unit 606 such as a keyboard, a mouse, etc.; an output unit 607 such as a displayer of various types, a speaker, etc.; a storage unit 608 such a disk, a CD and the like; and a communication unit 609 such as a network interface card, a modulator-demodulator, and a wireless transceiver, and the like. The communication unit 609 allows the device 600 to exchange information/data with other devices through a computer network such as the Internet and/or various telecommunication networks.

The computing unit 601 may be various general-purpose and/or special-purpose processing components with processing and computing capabilities. Some examples of the computing unit 601 include, but are not limited to, a central processing unit (CPU), a graphics processing unit (GPU), various dedicated artificial intelligence (AI) computing chips, various computing units that run machine learning model algorithms, a digital signal processing (DSP), and any appropriate processor, controller, microcontroller, etc. The computing unit 601 executes the various methods and processes described above, such as the method for distributed training a model. For example, in some embodiments, the method for distributed training a model may be implemented as a computer software program, which is tangibly contained in a machine-readable medium, such as the storage unit 608. In some embodiments, part or all of the computer programs may be loaded and/or installed on the device 600 via the ROM 602 and/or the communication unit 609. When the computer programs are loaded into the RAM 603 and executed by the computing unit 601, one or more steps of the method for distributed training a model described above can be executed. Alternatively, in other embodiments, the computing unit 601 may be configured to perform the method for distributed training a model in any other suitable manner (for example, by means of firmware).

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

The program codes for carrying out the method of the present disclosure may be written in any combination of one or more programming languages. These program codes may be provided to a processor or controller of a general purpose computer, special purpose computer, or other programmable data processing apparatus such that the program codes, when executed by the processor or controller, cause the functionalities/operations specified in the flowchart and/or block diagram to be implemented. The program codes may be executed entirely on the machine, partly on the machine, partly on the machine as a stand-alone software package and partly on the remote machine or entirely on the remote machine or server.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor system, apparatus, or device, or any suitable combination of the foregoing. More specific examples of machine-readable storage media may include one or more line-based electrical connections, a portable computer disk, a hard disk, a random access memory (RAM), a read-only memory (ROM), an erasable programmable read-only memory (EPROM or flash memory), an optical fibers, portable compact disk read-only memory (CD-ROM), an optical storage device, a magnetic storage devices, or any suitable combination of the foregoing.

To provide interaction with a user, the systems and techniques described herein may be implemented on a computer having a display apparatus (e.g., a CRT (cathode ray tube) or LCD (liquid crystal display) monitor) for displaying information to the user; and a keyboard and a pointing apparatus (e.g., a mouse or a trackball) through which a user can provide input to a computer. Other types of apparatus may also be used to provide interaction with a user. For example, the feedback provided to the user may be any form of sensory feedback (e.g., visual feedback, auditory feedback, or tactile feedback); and input from the user may be received in any form, including acoustic input, speech input, or tactile input.

The systems and techniques described herein may be implemented in a computing system including a background component (e.g., as a data server), or a computing system including a middleware component (e.g., an application server), or a computing system including a front-end component (e.g., a user computer having a graphical user interface or a web browser through which a user may interact with implementations of the systems and techniques described herein), or a computing system including any combination of such background component, middleware component, or front-end component. The components of the system may be interconnected by any form or medium of digital data communication (e.g., a communication network). Examples of communication networks include a local area network (LAN), a wide area network (WAN), and the Internet.

The computer system may include a client and a server. The client and server are typically remote from each other and typically interact through a communication network. The relationship between the client and the server is generated by a computer program running on the corresponding computer and having a client-server relationship with each other. The server may be a cloud server, which is also referred to as a cloud computing server or a cloud host, and is a host product in a cloud computing service system, so as to solve a defect that a conventional physical host and a VPS (Virtual Private Server) service are difficult to manage and have weak service scalability.

According to the technical solution in embodiments of the present disclosure, based on a distributed first trainer and a distributed second trainer that are heterogeneous, and a distributed built-in parameter server that is provided in the distributed second trainer, the speed at which a model is trained is improved.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for distributed training a model, comprising:

acquiring a training sample set from a distributed file system through a data server;

acquiring, by a distributed second trainer, each batch of training samples from the data server through a distributed first trainer;

performing, for each batch of training samples acquired by the distributed first trainer, model training through the distributed second trainer to obtain gradient information, the distributed first trainer being a first electronic device based on a Central Processing Unit (CPU), the second distributed trainer being a second electronic device based on a graphics processing unit (GPU) such that the distributed first trainer and distributed second trainer are mutually heterogenous; the distributed first trainer comprises a plurality of first trainers, the distributed second trainer comprises a plurality of second trainers, and the plurality of first trainers and the plurality of second trainers are in communication;

updating a target parameter in a distributed built-in parameter server provided in the distributed second trainer according to the gradient information, wherein the distributed built-in parameter server includes a plurality of built-in parameter servers, each of the plurality of built-in parameter servers is provided in a video memory of each second trainer in the distributed second trainer, and the target parameter is a portion of parameters of an initial model; and performing, in response to determining that training for a preset number of training samples is completed, a parameter exchange between the distributed built-in parameter server provided in the distributed second trainer and a distributed parameter server located outside the first and second trainers through the distributed first trainer to perform a parameter update on the initial model until training for the initial model is completed, wherein the parameter exchange comprises: transmitting the updated target parameter in the distributed built-in parameter server to the distributed first trainer to cause the distributed first trainer to transfer the updated target parameter to the distributed parameter server, to perform the parameter update on the initial model in the distributed parameter server; and acquiring a new target parameter from the distributed parameter server through the distributed first trainer, and loading the new target parameter to the distributed built-in parameter server.

2. The method according to claim 1, wherein the performing, in response to determining that training for a preset number of training samples is completed, a parameter exchange between the distributed built-in parameter server and a distributed parameter server through the distributed first trainer to perform a parameter update on the initial model until training for the initial model is completed comprises:

performing a following parameter update operation until the training for the initial model is completed:

transmitting, in response to determining that the training for the preset number of training samples is completed, the updated target parameter in the distributed built-in parameter server to the distributed parameter server through the distributed first trainer, to perform the parameter update on the initial model in the distributed parameter server; and acquiring a target parameter for a next parameter update operation in the distributed built-in parameter server from the distributed parameter server through the distributed first trainer.

3. The method according to claim 1, wherein the method further comprises:

adjusting a number of machines of a central processing unit in the data server according to a data scale of the training sample set.

4. The method according to claim 1, wherein an information exchange is performed between trainers through an information queue.

5. The method according to claim 1, wherein during the model training, computing power between the trainers is adjusted based on a load balancing strategy, to cause the trainers to be matched with each other in computing power.

6. An electronic device, comprising:

at least one processor; and a memory, communicatively connected with the at least one processor, wherein the memory stores an instruction executable by the at least one processor, and the instruction is executed by the at least one processor, to enable the at least one processor to perform operations, comprising:

acquiring a training sample set from a distributed file system through a data server;

acquiring, by a distributed second trainer, each batch of training samples from the data server through a distributed first trainer;

performing, for each batch of training samples acquired by the distributed first trainer, model training through the distributed second trainer to obtain gradient information, the distributed first trainer being a first electronic device based on a Central Processing Unit (CPU), the second distributed trainer being a second electronic device based on a graphics processing unit (GPU) such that the distributed first trainer and distributed second trainer are mutually heterogenous; the distributed first trainer comprises a plurality of first trainers, the distributed second trainer comprises a plurality of second trainers, and the plurality of first trainers and the plurality of second trainers are in communication;

updating a target parameter in a distributed built-in parameter server provided in the distributed second trainer according to the gradient information, wherein the distributed built-in parameter server includes a plurality of built-in parameter servers, each of the a plurality of built-in parameter servers is provided in a video memory of each second trainer in the distributed second trainer, and the target parameter is a portion of parameters of an initial model; and performing, in response to determining that training for a preset number of training samples is completed, a parameter exchange between the distributed built-in parameter server and a distributed parameter server located outside the first and second trainers through the distributed first trainer to perform a parameter update on the initial model until training for the initial model is completed, wherein the parameter exchange comprises: transmitting the updated target parameter in the distributed built-in parameter server to the distributed first trainer to cause the distributed first trainer to transfer the updated target parameter to the distributed parameter server, to perform the parameter update on the initial model in the distributed parameter server; and acquiring a new target parameter from the distributed parameter server through the distributed first trainer, and loading the new target parameter to the distributed built-in parameter server.

7. The electronic device according to claim 6, wherein the performing, in response to determining that training for a preset number of training samples is completed, a parameter exchange between the distributed built-in parameter server and a distributed parameter server through the distributed first trainer to perform a parameter update on the initial model until training for the initial model is completed comprises:

performing a following parameter update operation until the training for the initial model is completed:

transmitting, in response to determining that the training for the preset number of training samples is completed, the updated target parameter in the distributed built-in parameter server to the distributed parameter server through the distributed first trainer, to perform the parameter update on the initial model in the distributed parameter server; and acquiring a target parameter for a next parameter update operation in the distributed built-in parameter server from the distributed parameter server through the distributed first trainer.

8. The electronic device according to claim 6, wherein the operations further comprise:

adjusting a number of machines of a central processing unit in the data server according to a data scale of the training sample set.

9. The electronic device according to claim 6, wherein an information exchange is performed between trainers through an information queue.

10. The electronic device according to claim 6, wherein during the model training, computing power between the trainers is adjusted based on a load balancing strategy, to cause the trainers to be matched with each other in computing power.

11. A non-transitory computer readable storage medium, storing a computer instruction, wherein the computer instruction, when executed by a computer, causes the computer to perform operations, comprising:

acquiring a training sample set from a distributed file system through a data server;

acquiring, by a distributed second trainer, each batch of training samples from the data server through a distributed first trainer;

performing, for each batch of training samples acquired by the distributed first trainer, model training through the distributed second trainer to obtain gradient information, the distributed first trainer being a first electronic device based on a Central Processing Unit (CPU), the second distributed trainer being a second electronic device based on a graphics processing unit (GPU) such that the distributed first trainer and distributed second trainer are mutually heterogenous; the distributed first trainer comprises a plurality of first trainers, the distributed second trainer comprises a plurality of second trainers, and the plurality of first trainers and the plurality of second trainers are in communication;

updating a target parameter in a distributed built-in parameter server provided in the distributed second trainer according to the gradient information, wherein the distributed built-in parameter server includes a plurality of built-in parameter servers, each of the plurality of built-in parameter servers is provided in a video memory of each second trainer in the distributed second trainer, and the target parameter is a portion of parameters of an initial model; and performing, in response to determining that training for a preset number of training samples is completed, a parameter exchange between the distributed built-in parameter server and a distributed parameter server located outside the first and second trainers through the distributed first trainer to perform a parameter update on the initial model until training for the initial model is completed, wherein the parameter exchange comprises: transmitting the updated target parameter in the distributed built-in parameter server to the distributed first trainer to cause the distributed first trainer to transfer the updated target parameter to the distributed parameter server, to perform the parameter update on the initial model in the distributed parameter server; and acquiring a new target parameter from the distributed parameter server through the distributed first trainer, and loading the new target parameter to the distributed built-in parameter server.

* * * * *